United States Patent
Kuppinger et al.

(10) Patent No.: US 7,137,064 B2
(45) Date of Patent: Nov. 14, 2006

(54) SYSTEM AND METHOD FOR FACILITATING DOCUMENT IMAGING REQUESTS

(75) Inventors: Bettina Kuppinger, Boeblingen (DE); Kathleen Ann Tweeten, Hoffman Estates, IL (US); Cornelis Martinus Maria Van Der Ploeg, Mijdrecht (NL)

(73) Assignee: International Business Machines Corporation, Armonk, NY (US)

( * ) Notice: Subject to any disclaimer, the term of this patent is extended or adjusted under 35 U.S.C. 154(b) by 584 days.

(21) Appl. No.: 10/066,985

(22) Filed: Feb. 2, 2002

(65) Prior Publication Data

US 2004/0205466 A1    Oct. 14, 2004

(51) Int. Cl.
    G06F 15/00 (2006.01)
(52) U.S. Cl. .................. 715/507; 715/505; 715/506
(58) Field of Classification Search ........ 715/505–507, 715/530, 511; 709/203, 227; 705/1, 38; 707/3, 200, 2
See application file for complete search history.

(56) References Cited

U.S. PATENT DOCUMENTS

| | | | | |
|---|---|---|---|---|
| 5,129,016 A * | 7/1992 | Murakami et al. | ........... | 382/306 |
| 5,850,490 A * | 12/1998 | Johnson | ............. | 382/306 |
| 5,963,659 A * | 10/1999 | Cahill et al. | ............... | 382/139 |
| 6,169,998 B1 * | 1/2001 | Iwasaki et al. | ............. | 715/530 |
| 6,256,773 B1 | 7/2001 | Bowman-Amuah | ......... | 717/121 |
| 6,289,382 B1 | 9/2001 | Bowman-Amuah | ......... | 709/226 |
| 6,332,163 B1 | 12/2001 | Bowman-Amuah | ......... | 709/231 |
| 6,339,832 B1 | 1/2002 | Bowman-Amuah | ......... | 714/35 |
| 6,721,713 B1 * | 4/2004 | Guheen et al. | ............... | 705/1 |
| 6,810,404 B1 * | 10/2004 | Ferguson et al. | ........... | 707/200 |
| 2001/0011246 A1 * | 8/2001 | Tammaro | .................... | 705/38 |
| 2001/0011250 A1 * | 8/2001 | Paltenghe et al. | ............ | 705/41 |
| 2001/0054106 A1 * | 12/2001 | Anderson et al. | ........... | 709/227 |
| 2002/0013788 A1 * | 1/2002 | Pennell et al. | .............. | 707/507 |
| 2002/0052841 A1 * | 5/2002 | Guthrie et al. | ................ | 705/40 |
| 2002/0095432 A1 * | 7/2002 | Shimomura et al. | ........ | 707/200 |
| 2002/0111911 A1 * | 8/2002 | Kennedy et al. | .............. | 705/51 |
| 2003/0002068 A1 * | 1/2003 | Constantin et al. | ........ | 358/1.15 |
| 2003/0005050 A1 * | 1/2003 | Pineau et al. | ............... | 709/203 |
| 2003/0033319 A1 * | 2/2003 | Van Der et al. | ............ | 707/102 |
| 2003/0050919 A1 * | 3/2003 | Brown et al. | .................. | 707/2 |
| 2004/0039687 A1 * | 2/2004 | Lent et al. | .................... | 705/38 |

OTHER PUBLICATIONS

ScanWise 2.00 Print out (hereinafter Printout), copyright 2001, pp. 1-20.*
ScanWise 2.00 Print out, copyright 2001, pp. 1-28 (pp. 1-20 are the same as previous provided).*
AAdvantage Systems, published at the following Internet URL: http://www.aadvantage.net/visiflow/index.htm, and downloaded on Jul. 26, 2001 (1 page).

(Continued)

*Primary Examiner*—Stephen Hong
*Assistant Examiner*—Thu V. Huynh
(74) *Attorney, Agent, or Firm*—Samuel A. Kassatly (57) ABSTRACT

A document image management system and associated method for integrating the operations of various independent software applications and the reuse of data entries within an enterprise, to increase productivity and promote a flexible method for the visualization of complete and coordinated information contained on a plurality of form pages. To this end, the system and method use an electronic checklist that enables the automated population of data fields in the checklist, and the reuse of the collected data in other applications. The system further includes additional tools that use the knowledge information to enable an efficient use of the knowledge within an enterprise, including the ability to develop a context for, and visualization of such knowledge.

20 Claims, 4 Drawing Sheets

OTHER PUBLICATIONS

AAdvantage Systems, published at the following Internet URL: http:///www.aadvantage.net/visiflow/overview.htm, and downloaded on Jul. 26, 2001 (5 pages).

Step2000, "All-In-One" Electronic Document and Data Management and Workflow Solutions, published at the following Internet URL: http://www.dissolution.com/s2000info.htm, and downloaded on Jul. 26, 2001 (5 pages).

* cited by examiner

FOLDER & DOCUMENT STRUCTURE

FIG. 4

SYSTEM AND METHOD FOR FACILITATING DOCUMENT IMAGING REQUESTS

FIELD OF THE INVENTION

The present invention relates in general to the field of data management, and in particular to a system and method for integrating the operations of various independent software applications directed to the management of information. More specifically, the present invention is directed to a system and method for the reuse of data entries in a plurality of integrated software applications directed to the management of information within an enterprise.

BACKGROUND OF THE INVENTION

Corporate entities typically collect, manage, and review massive amounts of information electronically on a daily basis. Such information is comprised of structured, numerical data, and unstructured text documents, wherein separate data entry forms often require duplicate information within their fields, such as "customer name," "customer number," "customer address," and so forth.

These processes are usually cumbersome and error-prone due to manual updates to related data and documents. The high error rates are caused by missing or wrong key information (e.g., customer number). In addition, there may be data inconsistencies. For example, a customer's name may not match the customer's assigned number.

These processes also tend to be user-unfriendly, hampering workflow and decision making due to their lack of integrating textual and numerical information. They further lack in efficiency, since duplicate information fields are entered and re-entered manually. Re-keying of certain data, such as customer number or contract number, in an order entry or contract management application, presents another set of issues, namely reduced productivity and increased possibility of data entry errors.

Furthermore, these processes are inflexible in handling data changes during the information gathering stage. A minimal change, for instance, to the "customer name" may induce a series of changes everywhere the "customer name" field appears in the document, requiring modifications of yet other relational documents.

It would therefore be desirable to have a system that addresses and resolves these concerns.

SUMMARY OF THE INVENTION

The present invention addresses these shortcomings and enables user-friendly, error-free data entry with minimal or no inconsistencies, thus increasing productivity and promoting a flexible method for the visualization of complete and coordinated information contained on a plurality of form pages. To this end, the system of the present invention uses an electronic checklist that enables the automated population of data fields in the checklist, and the reuse of the collected data in other applications.

The system and method of the present invention reuse data entry in a plurality of integrated software applications directed to the management of information within an enterprise. The system is expandable, with built-in information integration features that facilitate the visualization and sharing of information among the integrated information management applications so as to incorporate information and facilitate the manipulation of such information. The system further includes additional tools that use the knowledge information to enable an efficient use of the knowledge within an enterprise, including the ability to develop a context for, and visualization of such knowledge.

In operation, a user initiates a request to image documents through what is referred to herein as a web-based coversheet application. This coversheet application features an electronic checklist, which is used to validate critical data elements such as customer number, contract number, mode of transmittal, and new transaction or update.

Based on the input, other data fields are populated automatically through links to other applications, for example a customer records master application. Through this application, the documents will be submitted to an imaging application and, if attached as file, automatically received and stored as image in an imaging database.

The data collected in the coversheet will be used for automated indexing. In addition, the coversheet application is used by administrative personnel to review the submission, update the status, and initiate workflow for subsequent processing. The data collected can also be fed to other applications such as contract management or order entry. The application is also the entry point for the submitter or administrative personnel to check the status of the document submission and search for archived images.

One advantage of the method described herein is its flexibility to be adapted to a number of information integration needs. Although this method is described in terms of web-based document preparation for administrative processing, the present invention is applicable within any enterprise seeking fast, complete, and accurate document imaging. For example, some of the aspects of the present invention may be used for linking structured and unstructured data while others may provide information integration with visualization and utilization of such data.

BRIEF DESCRIPTION OF THE DRAWINGS

The above and further objects, features and advantages of invention will become clearer from the more detailed description read in conjunction with the following drawings, in which.

DETAILED DESCRIPTION OF PREFERRED EMBODIMENTS

Figure 1:
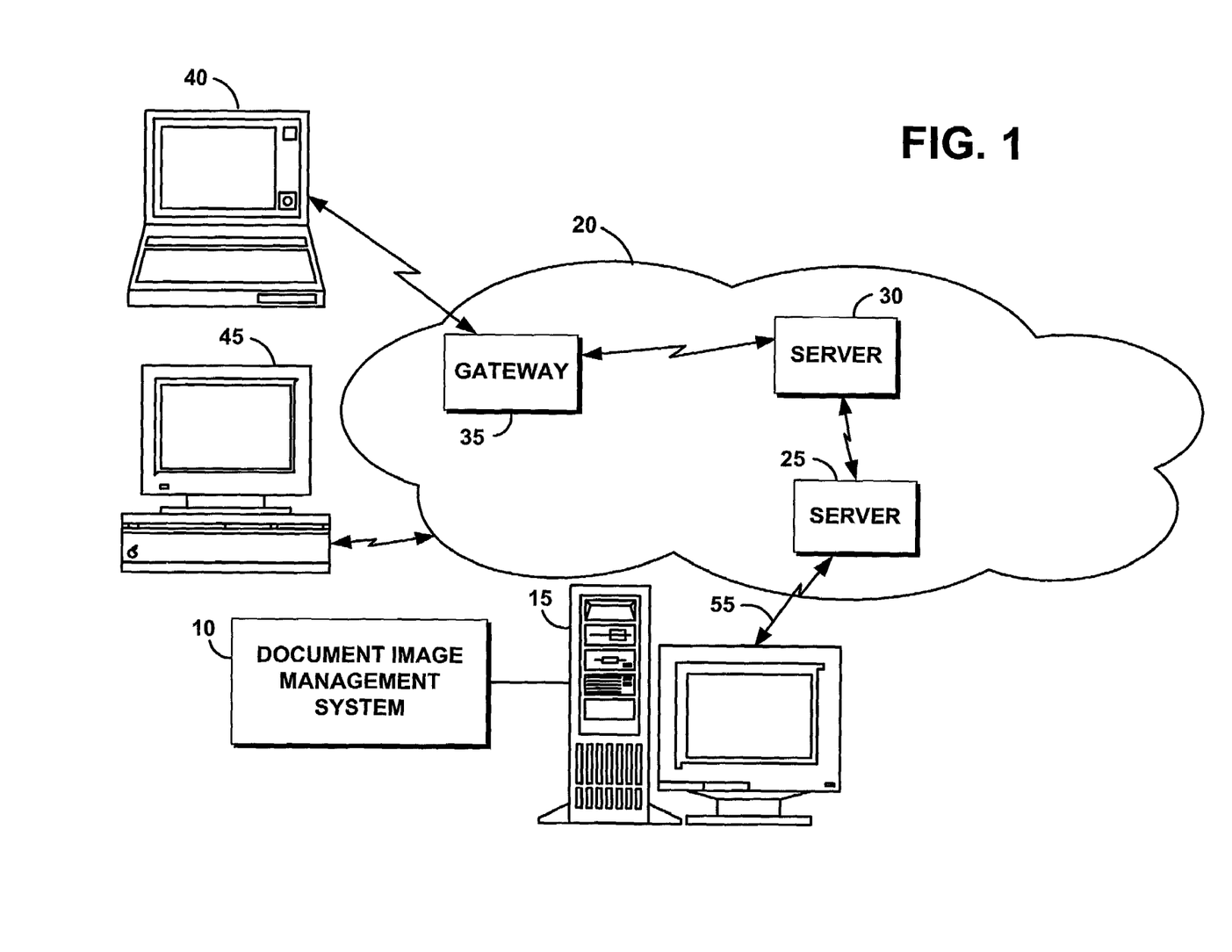
FIG. 1 is a schematic illustration of an exemplary operating environment in which a system and method for facilitating document imaging management may be used according to the present invention.

FIG. 1 portrays an exemplary environment in which a system and method for facilitating document imaging management according to the present invention, may be used. The document image management system 10 includes a software or computer program product that is typically embedded within or installed on a host server 15. Alternatively, the system 10 can be saved on a suitable storage medium such as a diskette, a CD, or hard drive, or like devices.

The cloud-like communication network 20 is comprised of communication lines and switches connecting servers such as servers 25, 30 to gateways such as gateway 35. The servers 25, 30 and the gateway 35 provide the communication access to the Internet. Users, such as managers, employees, clients or other remote Internet users are represented by a variety of computers such as computers 40, 45. The host server 15 is connected to the network 20 via a communications link 55 such as a telephone, cable, or satellite link. The servers 25, 30 can be connected via high speed Internet network lines to other computers and gateways.

Figure 2:
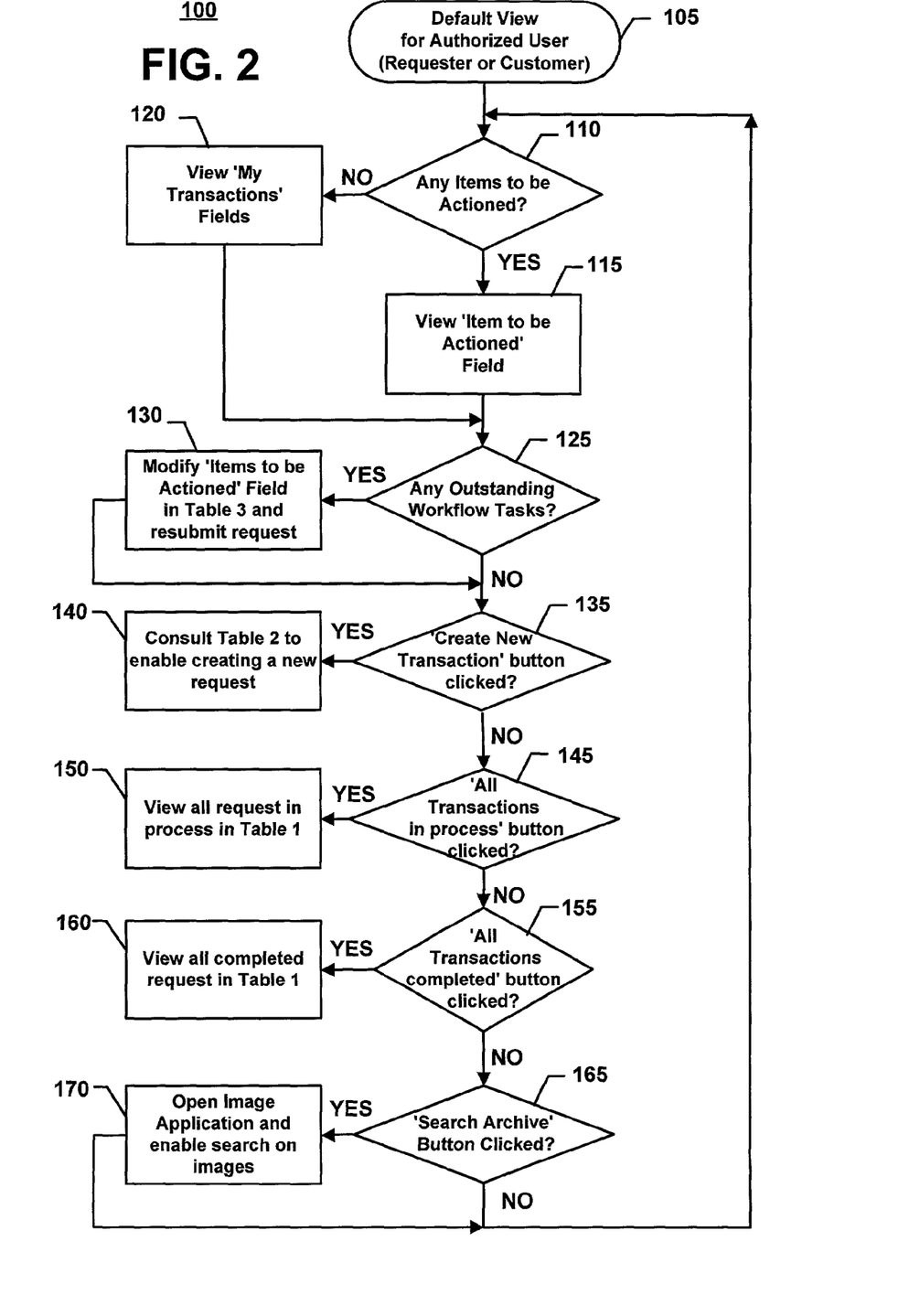
FIG. 2 is a process flowchart describing a requester role view that can also be valid for customers.

FIG. 2 illustrates a requester role view process 100 according to the present invention. The description applies to a customer as well, if he/she has been granted access to the coversheet database. The requester role view process 100 is initiated at block 105 wherein the default view for an authorized user, illustrated in the appended Table 1, accesses information as implemented by the present invention.

The requester role view process 100 determines at step 110 if items are to be actioned. As used herein, the term "item" refers to one or more requests that require additional information or update, and the term "actioned" refers to requested changes and/or additions to be processed.

If the requester role view process 100 determines that no such actionable item is present, it proceeds to step 120, where the user will be logged to a default view "My Transactions" showing all saved and/or in process and/or complete requests of the requester. At any step within the default view, the user can open or close separate "Saved," "In Process," or "Completed" views, as illustrated in Table 1.

Within a default opened window, the user may select a "Create New Transaction" view, invoking the input screen illustrated in the appended Table 2, or the requester role view process 100 checks if there are any outstanding workflow tasks for the user. If an outstanding workflow task exists, process 100 proceeds to step 130, where the data fields of the "Items to be Actioned" are updated on the screen and the request is resubmitted, as outlined for example in the appended Table 3. Otherwise, process 100 proceeds to decision block 135.

At decision block 135, the requester role view process 100 checks if there are any new transactions to be created by the user. If so, the requester role view process 100 continues to step 140 where, at the command of the user, the requester role view process 100 loads the screen "Create New Transaction" illustrated in the appended Table 2. Otherwise, the requester role view process 100 continues to decision block 145

At decision block 145, the requester role view process 100 checks if the "All Transactions in process" feature in Table 1 has been selected. If so, the requester role view process 100 continues to step 150, where the user views all requests still in process. Exemplary transactions are outlined in the appended Table 1. Otherwise, the requester role view process 100 proceeds to decision block 155.

At decision block 155, the requester role view process 100 checks if the "All Transactions completed" feature in Table 1 has been selected. If so, the requester role view process 100 continues to step 160, where the user views all completed requests. Exemplary transactions are outlined in Table 1. Otherwise, the requester role view process 100 proceeds to decision block 165.

At decision block 165 if the "Search Archive" feature has been selected, the requester role view process 100 continues with the search task at step 170. The user will be enabled to enter search criteria (index values) to search on either document or folder level within the electronic archive (Imaging Application). Otherwise, requester role view process 100 loops back to decision block 110, to check for new items to be "actioned".

Figure 3:
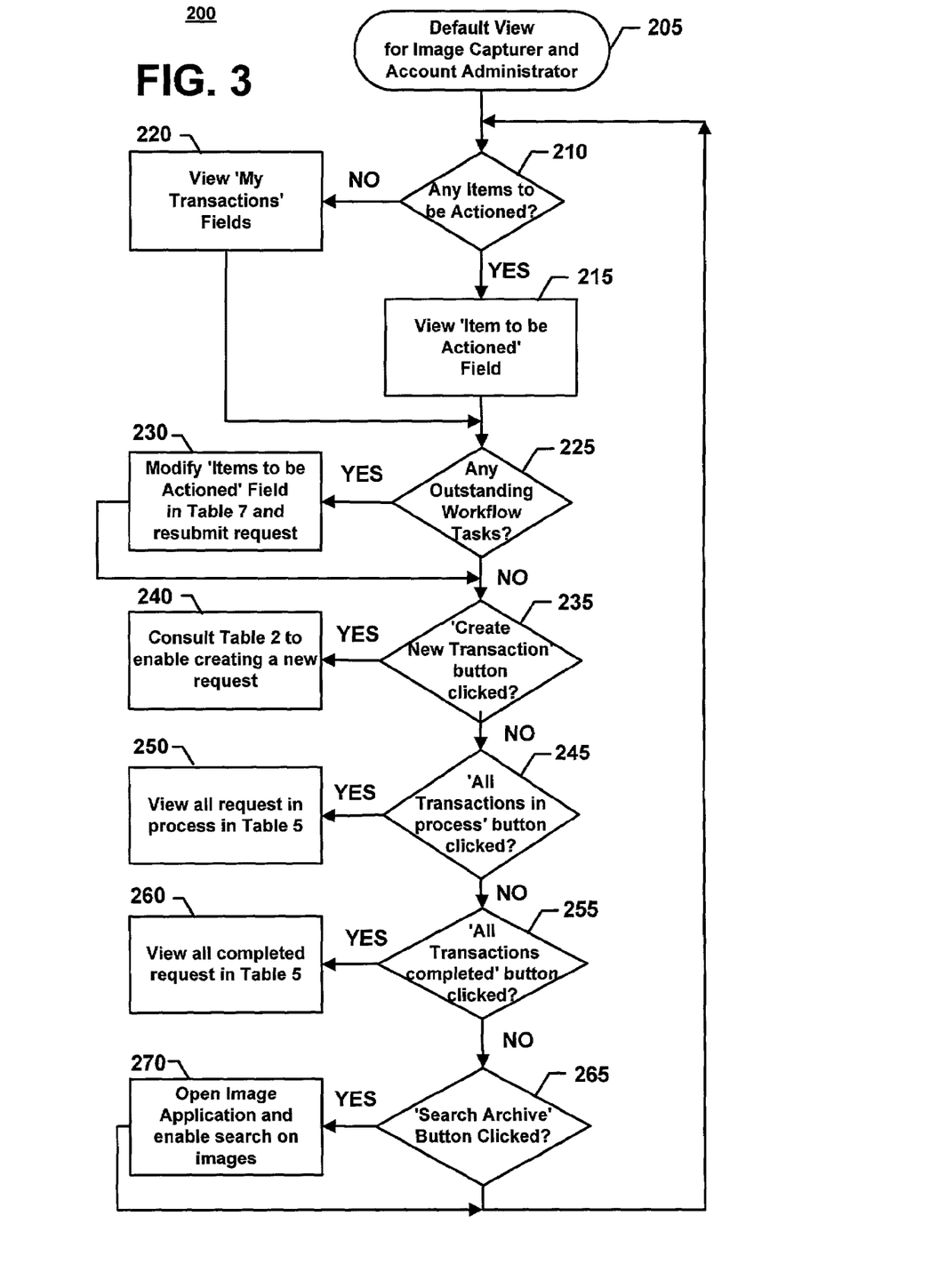
FIG. 3 is a process flowchart describing an image capture role view that can also be valid for an account administrator.

Turning now to FIG. 3, it illustrates an image capturer role view process 200 according to the present invention. The description applies to an account administrator as well, who can have the same views at a later stage of the process. Later references to image capturer role view apply equally to account administrator role view.

The image capturer role view process 200 is initiated at block 205 wherein the default view for an image capturer, illustrated in the appended Table 5, accesses information as implemented by the present invention.

The image capturer role view process 200 determines at step 210 if items are to be actioned, e.g., newly issued requests. If the image capturer role view process 200 determines that no such actionable item is present, it proceeds to step 220, where the user will be logged to a default view "My Transactions" showing all tasks handled by the image capturer. At any step within the default view, the image capturer can open or close separate "Saved," "In Process," "on hold" or "Completed" views, as illustrated in the appended Table 5.

Within a default-opened window, the user may select a "Create New Transaction" view, invoking the input screen illustrated in Table 2. This task is performed if the requester has no access to the coversheet database or documents are sent in via fax or mail. The image capturer role view process 200 checks if there are any outstanding workflow tasks for the user. If an outstanding workflow task exists, process 200 proceeds to step 230, where the data fields of the "Items to be Actioned" are updated on the screen and the request is resubmitted, as outlined for example in the appended Table 7. Otherwise, process 200 proceeds to decision block 235.

At decision block 235, the image capturer role view process 200 checks if there are any new transactions to be created by the user. If so, the image capturer role view process 200 continues to step 240 where, at the command of the user, the image capturer role view process 200 loads the screen "Create New Transaction" illustrated in Table 2 below. Otherwise, the requester role view process 200 continues to decision block 245

At decision block 245, the image capturer role view process 200 checks if the "All Transactions in process" feature in Table 5 has been selected. If so, the image capturer role view process 200 continues to step 250, where the user views all requests still in process. Exemplary transactions are outlined in Table 5. Otherwise, the image capturer role view process 200 proceeds to decision block 255.

At decision block 255, the image capturer role view process 200 checks if the "All Transactions completed" feature in Table 5 has been selected. If so, the image capturer role view process 200 continues to step 260, where the user views all completed requests. Exemplary transactions are outlined in Table 5. Otherwise, the image capturer role view process 200 proceeds to decision block 265.

At decision block 265 if the "Search Archive" feature has been selected, the image capturer role view process 200 continues with the search task at step 270. The user will be enabled to enter search criteria (index values) to search on either document or folder level within the electronic archive (Imaging Application). Otherwise, image capturer role view process 200 loops back to decision block 210, to check for new items to be "actioned".

Appended hereto are Tables 1 through 7, which will now be described in more detail.

In Table 1, the default view of the request database shows the content of "Items to be actioned" (if any is available) and "My Transactions," separated on the right part of the screen by "Saved Requests," "in process" requests, and "completed" requests.

If the user selects the "Create New Transaction" feature, the input screen in Table 2 appears. If there are any outstanding workflow tasks for the user, they will be shown in the "Items to be actioned" field. Within the default view, the user can open or close the separate "Saved," "In Process," or "Completed" views.

If the user clicks the "All Transactions" feature, all transactions as processed via this request database, separated by "In Process" and "Completed" status, will appear. The request documents will remain available for a specified period of time, after which, the related content manager documents and folders can still be retrieved by using the "Search Archive" option.

If the "Search Archive" feature is selected, the user is able to specify whether he/she wishes to search for folders or a certain document type, enter any available index data to perform the search, and examine the search results to determine if they contain what the user is seeking.

By default, the request database shows the user transactions as belonging to his/her country (derived from the user ID). It is possible to make a selection from a number of countries by specifying the Customer Number or Enterprise Number.

Table 2 details the data entry fields and features of a screen for new transactions. Fields are either alphanumeric or date. The top row features are described as follows:

Sequence: Automatically generated after submission, or if the submitter enters a sequence number in this field, the data from that sequence number will be copied to the new request.

Request Date: Automatically filled with today's date the moment the document is created.

Urgency: A dropdown menu with normal (default) and urgent settings to be determined by the requester.

Submitter: Automatically filled based on user ID logged on to coversheet application.

Country: Automatically filled based on user ID.

Customerno: Customer number to be entered by the user (check on 6 or more positions numeric).

Customer Name: To be entered by as an alphabetical string allowing spaces. (Number of digits is user-definable. After submitting a request, the Customer Master Record, will be accessed and the name retrieved. The retrieved name will appear in the field to the right of the "Name" feature.

Enterprise number: Automatically filled based on the Customer Records Master data retrieval.

Contractno: Contract number to be entered by as an alphanumeric string (number of digits user-definable).

Trackingvalue: To be entered by as an alphanumeric, allowing special characters such as a forward slash "/". (Number of digits user-definable). These are values in addition to customer number, customer name and contract number. Different values can be defined e.g., based on product type or organization.

Product Type: A dropdown menu with the following options:
Services
Hardware
Hardware/Software
Software Brand: A dropdown menu whose options are determined by the selection from the "Product Type" selection. Its options include e.g.
Maintenance
Professional Services
Outsourcing
Server
PCs
Middleware
PC Software Requested Action: A dropdown menu whose options are determined by the selection from the former dropdown menu. Its options include:
Create Customer number
Process Customer data change (as action above with different data to fill)
Process Contract (request to have (contract) documents imaged and contract management started.

It should be noted that the following data fields: Customerno, Name, Contractno, Trackingvalue, ProductType, Brand, and Requested Action will automatically be copied (all values are adaptable). Optionally, the submitter can decide to add a copy of the documents as an attachment.

Documents delivered:
in the first, or leftmost, column, there exist three options: a Yes (Y), No (N), or "Attach". If The No option is selection, the value defaults to N. Upon clicking Y or N, the value is echoed in the same field. If the "Attach" option is selected, a screen opens with a selection of files to be attached; an icon of the attached document appears in the same field.

Entries in the second column from the left depend on "mandatory" or "optional" instructions in the third column. Mandatory documents are in the form of a pull-down menu with options such as "Contract," "Pricing data," and "Configuration data." Optional documents may also be in the form of a pull-down menu with preset options such as "Correspondence" and "Statement O.W.," or may allow commentary entries.

The third column indicates whether the document is mandatory or optional. These instructions are based on former selections made in the "Product Type," "Brand," "Tower," and "Requested Action" fields. If a mandatory document field is left blank in the second column, the request will not be processed.

The fourth column, method of sending, has a pull-down menu with options: "Mail," "e-mail," or "Fax" if Y or N is selected in first column. An entry "n" indicates that nothing will be sent. If "Attach" is selected in first column, "Attached" appears in this field automatically.

"Senddate" will default to today's date and allow adaptation back and forth in time. Backdating can be used if documents have already been sent via mail or fax at time of submitting request form.

Click to Save request and work on it later: If this option is selected, the screen closes and the user is returned to the start screen of the request database. The document content is saved on the database and the request document is copied to the "Existing Requests," "My Transactions," and "Saved Requests" view. Whenever the user decides to resume working on the request, he/she opens the request in that view and resumes work from the point at which he/she saved the request.

Cancel a request: Should the user decide to cancel the request (say to avoid duplicate effort by a colleague), he/she can press the "Escape" key on the keyboard. This action opens a window where he/she can choose to either "save" the attached document in order to re-use it for another request, or "cancel" the document (all entries will be lost).

Click to submit request: If this option is exercised, the following sequence of events takes place:

The input screen closes, returning the user to the print screen if he/she has indicated that a document is to be sent by either Fax, Mail, or e-mail. If only attachments are included, a wizard will prompt the user: do you want to create another request? "Yes" or "No"?". If "No" is selected, the user is returned to the basic view of the database. If "Yes" is selected, a new input screen prompts the user. At this point, it is possible for the user to save the request and complete it later (as described above). Also, it is possible for the user to start a new request based on a former request where all data, from the previous request, are copied into the new request, eliminating the retyping of repetitive data.

In the print screen, the user can select the printer where the Coversheet is to be printed. If the user elects not to print, he/she may cancel or save the request; in either event, the next steps will not be executed. Only if a printer is selected, the following steps will be executed, after which, the request will be sent to the specified printer.

A workflow process is started (depending on selections made, but first steps always are):

A unique sequential number is generated and added to the request.

A query on Customer Records Master data will be performed to retrieve:
  The customer name,
  The Enterprise number to which this customer belongs
  The branch/territory information
  The currency indicator for this customer (e.g., Euro, Yen, Dollar)
The request's data fields are updated with the retrieved data, other data are stored in the data container of the newly started workflow process to be used later in the process.

A "Case Folder" is created within the content manager. Nested within the Case Folder is a Process Folder. The Process Folder IDs are stored on the request document and in the data container of the workflow process.

Figure 4:
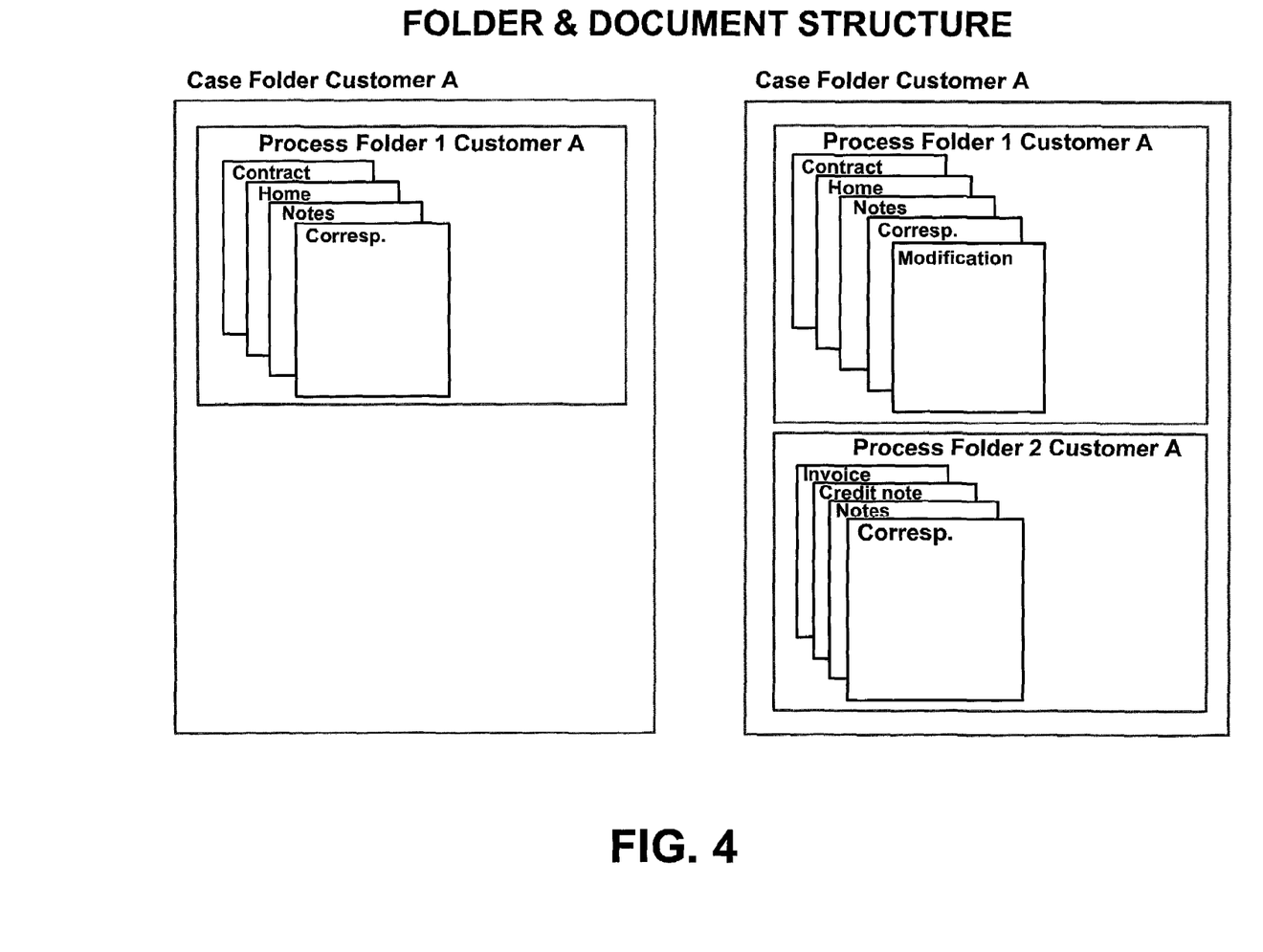
FIG. 4 is a schematic illustration of an exemplary folder and document structure.

When starting an initial imaging request, a Case Folder is created in the back ground automatically (for example, "request number" is XXX/customer-case. Within this Case Folder, a Process Folder is created (for example, an imaging request for this "request number"). All related documents are then stored within the Process Folder. A case folder can hold multiple process folders to make it easier to identify different processes within one customer case. Example: contract documents are in one process folders, credit notes referring to this contract are in another process folder. If indexing, all documents in the Process Folder and the Case Folder, are automatically indexed in order to be able to retrieve related information in the Content Manager on the Case Folder level, Process Folder level, or document level. This is illustrated in FIG. 4.

When the contract is fulfilled, the request document remains available on the Coversheet Database and the documents are archived in the Content Manager. If, at some later date, the same customer indicates that there are changes to the contract or his/her account needs to be credited, the Account Administrator searches the Coversheet Creation Database for the initial "image contract" request and performs the steps necessary to re-open the request. As shown in Table 2, the sequence number of the original request is entered in the field 'enter a sequence number in the above field from which to copy date from'. All data available on this former request will be copied to the new request (preventing to enter all data again). Also, the reference to the initial Case folder is copied. In addition a choice box is displayed to either add documents to any of the existing process folders (e.g., if documents have to be added in case of a contract change), or to create a new process folder within this case folder (e.g., if a credit note has to be processed). Based on this choice new document images are either added to one of the existing process folders or added to a new process folder. This task can be performed by either the person who processed the original request or by some other person, depending on the organizational setup.

All documentation imaged during this process will be added to the existing or new Process Folder, depending on the choice above. So, if at a future date an Account Administrator inquires the Content Manager about a Case Folder level, he/she may find several Process Folders, for example an "image contract" and a Credit Note Request folder. All process folders will have all information pertaining to this request and are available for queries.

It should be noted that without having this overall Case Folder structure, the Account Administrator would have to search through a multitude of document types or enter a generic search command, which typically returns too many hits. If a user queries with the same search arguments, he/she will see a Case Folder and within it only the Process Folders he/she is authorized to view.

If it is specified in the request form that the attached documents are to be automatically uploaded, they are uploaded in the Process Folder based on the document type, e.g., contract, correspondence, statement of work etc. The document type is shown on the request form and is determined automatically if a document is attached on a specific line in the request form (e.g., contract) or manually based on the submitter's choice. It is possible to have different document types within one process folder. Also multiple instances of one document type can exist (e.g., multiple pieces of correspondence.

The attachments are uploaded as an image in the image application. In addition they can be left on the request database for a certain period (e.g., as a personal repository of documents, as long as the contract is not yet processed). It is advisable to automatically remove the attachments after completion in order to save space. Also at that time the documents can be retrieved as an electronic image.

The folders and documents within the case folder will automatically be indexed with the data pursuant to the instructions on the request form (customer number, customer name, etc.).

The Cover Sheet data base shows the request instance in the "In Process" view.

A copy of the request form is stored within the Case Folder residing in the Content Manager. An audit trail for the request form is available If any Fax, Mail, or e-mail send request was made in the request form, a copy of the request form is sent to the assigned printer.

The next activity in the process is activated for the Image Capture role within the user's "New Requests" view.

After submitting a new request, if the user opens the Existing Transactions view, he/she can retrieve the request from the "In process" subsection of "My Transactions" view.

Table 3 illustrates a screen of a request in process, wherein, the following read and write field and commands are:

Print: The above mentioned request form, will also appear on the printer if any mail, e-mail, or fax send is indicated.

The following functionality is added in the request form:

If the "Open Image Folder" feature is pressed, the user can view the folder structure in Content Manager and the automatically uploaded documents inside of it, if any.

Barcode: A barcode is added to hold the folder ID and the request sequence number in order to link between a batch of documents and its related folder structure in the Content Manager during scan, or OCR for Fax, thus avoiding actively searching for it.

In the Workflow Trail area, the user can verify that the request is assigned to the "Image Capture" role. This is done with a date and time stamp. As soon as work is started on this request, the next line writes a date and time stamp and echoes the user's notes/internet address in the same field.

Retrieved Customer Name: The customer name is retrieved from Customer Records Master data and added, enabling the user and/or the first check point within the workflow, to detect any error(s) made while entering the "customer number," by comparing this retrieved name with the entered customer name as performed by the user.

Enterprise number: The enterprise number, to which the customer belongs, is retrieved from Customer Records Master database.

Auto uploaded status is turned on if the attached contract is of a document type specified to be automatically uploaded in Content Manager. Documents may also undergo a conversion by the Image Capture or may be printed or scanned into Content Manager.

Within the "Existing Transactions" view, the Request database defaults to open "My Transactions." Table 1 depicts this view, wherein the user can find information related to any request he/she once started:

a. Saved Requests
b. Requests in Process
c. Completed Requests

A. Saved Requests:

While entering a new request, the requester may save his/her work at any completion stage. When ready to resume work on it later, the requester goes to this view, opens the document and simply continues where he/she left off at the time of saving. The requester is able to either complete the request (click "submit this request" feature), save it again for later (click "save request to work on it later" or cancel the request (hit the "Escape" feature and confirm to cancel).

B. Requests in Process:

As long as a request has not completed executing, the requester can find his/her request in this view. One of the columns shown in this view is the currently active requester on it (the one within the workflow who is currently working on this task). This enables the requester to directly acknowledge where in the process his/her request is and who is working on it.

C. Completed Requests:

As soon as a request is completed, the request form remains for a specified period within this view enabling the requester to simply search for it. If he/she opens it, it directly links to the content management documents associated with it.

Table 4 shows a transposed array from the Existing Transactions view of Table 1. Since the columns of Table 1 are truncated for lack of space, Table 4 is used to list the missing entries in Table 1. If a column header is selected, the data in the "Existing Transactions" view are sorted and displayed within the column. If double-selected, the sequence is inverted. The default sort of the view is by sequence number.

Referring now to Table 5, and as presented earlier, upon the submission of a request, a sequence of automated work is performed in the background. The last step mentioned there, is that the task becomes available within the "Image Capture" group within which every user is authorized to perform the Image Capture role, which included checks for completeness.

Table 5 describes the request database for a user performing Image Capture, wherein, if a user opens a "New Request" as available under the "Items to be Actioned" view, the request becomes his/hers alone locking all other users out of it until (a) he/she transfers the task to a colleague within the group, who in turn possesses it, or (b) the task is completed.

The database for the requester role opens, by default, to show the "Items to be Actioned" (available for the whole group) and the content of their work at hand, (available in "My Transactions" view).

The issued request is shown in Table 5 under "Items to be Actioned" (only a portion of the data is displayed in order to fit in this document).

Table 5 also illustrates other views for the Image Capturer role, wherein, the "Saved Requests" field in the "My Transactions" view concerns any new requests issued by the Image Capturer which are saved, but not completed. The "In Process" field holds all tasks on which he/she is currently working. The "On hold" field holds all tasks for which he/she has an outstanding request to the user. The "Completed" field holds all tasks for which he/she did complete the Image Capture role.

Within the "All Transactions" view, the Image Capturer views all transactions in process (including the ones from his/her colleagues) and all completed transactions.

The column headers of the Image Capture role are outlined in Table 6. In Table 6, the data as available in the detail request form are shown and explained.

The "Mail" and "Fax" input indicators enable the user to directly acknowledge that the request is completely electronic (both indicators will be on "n"). This means the user can complete the request without any checking of incoming mail or fax. If the user does not indicate that all documents in the request are received, the outstanding status remains "Y" until the document arrives in the mail.

The new incoming task may be (a) any newly created request or (b) for additional information, that is any added information to a request on hold or a request in process.

Table 7 illustrates data changes available in the request document, as it appears to the Image Capturer role, wherein:

Complete feature: If the Image Capturer completes his/her task, he/she presses the "Complete" feature, which results in an update of the request document on the database. The next role defined within the process, in this case, Account Administrator, starts its task, e.g., contract management.

If the Image Capturer presses the Save feature, the request document is saved on the request database in the "My Requests" view. When the Image Capturer decides to continue working on it, the Image Capturer can resume work where he/she left off.

The Image Capturer presses the Respond feature if the number of received pages or documents is not correct. In this case the Image Capturer checks through the image application whether the faxed-in document contains all pages and whether the attached contract is indeed the requested contract document and not some other accidentally attached. This opens a screen enabling him/her to type in what the Image Capturer requires from the requester in order to correctly perform the task at hand.

If the Image Capturer completes doing so, a note is sent to the requester (whose address is automatically copied from the request document) containing the comments of the Image Capturer and a direct link to the related request document on the request database.

If the receiver clicks on this link, the request document opens automatically; otherwise, the receiver opens the request manually in the request database. In either case, the task is found in the field to the right of "Items to be Actioned."

At the moment the Image Capturer completes the note to the requester, the request task for the Image Capture role is moved to the "On Hold" view within the "My Requests" view of the Image Capture person. An automated reminder can be set, ensuring that after a specified period of time (e.g., 5 working days) the task automatically re-appears in the "in process" view of the Image Capture person with a task called "Reminder/Cancel."

If the Image Capturer opens this task, he/she can either send a reminder note to the requester to fulfill the required actions, or Cancel the task, after which all related Content Manager data are deleted and a message is sent to the requester that due to insufficient information the request could not be handled.

If the requester completes his/her task by sending the page and completing his/her request document, the task automatically appears again in the "in Process" view of the Image Capturer who initially sent the notification, informing him/her that an update took place and he/she can now continue the Image Capture task.

During the "Respond" action in the Image Capture role, the note may indicate that the request need not be put on hold. That is, the process may continue, despite incompleteness of (unessential) data. In this case, the action to the requester remains the same. The request is then processed and completed by the Image Capturer who presses the complete feature upon task completion.

In this case, the task is split into two separate tasks: One for the Account Admin (to handle the request) and one for the requester (to complete the required documents). After the requester completes his/her part of the task, a new task, "Additional info", appears in the Image Capturer role view. This task sends missing pages/documents mentioned in the Image Capturer's "Respond" note.

If the Transfer feature is selected, a list of all persons performing the same "Image Capture" role is displayed enabling the Image Capturer to transfer a task to one of his/her colleagues. This feature is also available in the "In Process" view within "All Transactions."

If the Cancel feature is selected, the request is cancelled. However, the Image Capturer has the option to save the Content Management information, or re-use it for another request, by entering the sequence number of the request. By allowing the re-use of Content Management information, all documents are transferred to the related folder, preventing the additional (unnecessary) rescanning of documents, especially if they are to be attached to another (duplicate) request.

Change Workflow feature: For defined processes retrieved from given input on request document, the Image Capture role makes this feature available to ensure that the correct role within the proper organization is performing the appropriate step within the workflow. This feature can be used with processes where the apt workflow cannot be automatically retrieved from the request document, such as mandatory additional index fields as to be entered by the Image Capture role, for circumstances where those values are also used to index and retrieve information.

Updated Workflow Trail: This field automatically shows a synopsis of the work in progress, as soon as the request is saved, transferred, completed, or put on hold. If the request is cancelled, this will be the last update in the workflow trail. Together with the name of the performer, the date and time stamp, always the performed action (completed, saved, cancelled etc.) is mentioned on this audit trail line.

The following example from Table 7 illustrates an exemplary Updated Workflow Trail: The first line shows that on Mar. 03, 2001, at 1:03 p.m. the task was presented to the Image Capture group, and the started Workflow process was called "process contract by dept. XYZ." The second line shows that the request document was saved on Mar. 03, 2001, at 3:30 p.m.

Index Field (multiple): Depending on the requested task, additional Index fields are available which can be completed optionally by the user before completing his/her Image Capture task or, further on, in the process by the Account Admin. An Index Field is crucial, especially if its specification is necessary to automatically divide in more detail the next part of the workflow to be executed. Any updated index fields are automatically copied to all Content Manager folders and documents related to this request.

Available or Outstanding document status: Within the documents section, any "attached" electronic documents are automatically set to "Available" status. The "Fax" field, which is stated as "available" also, relates to a fax, sent to the direct-fax-in number of Content manager. The image solution has a feature enabling to directly fax in a document into the image application as an image. Alternatively a document can be faxed to a department fax machine and then manually scanned into the image application. Within the Fax solution, the Request document (cover page), being the first page of the incoming fax, is processed by either OCR (Optical Character Recognition) or a barcode reader. The barcode holds information about what folder-ID (internal Content manager ID) the document should be added to. The barcode also contains information about what sequence of the request database holds the request document. As the request document contains only one document with the indication to be sent by fax, the document type to be used can automatically be retrieved from the request document. This incoming fax is added to the proper folder, with document type, "Configuration data", and the index fields. As the index fields are already available on the existing folder and documents, the index data is automatically copied to this newly added document (being the fax). The Request document is automatically updated with "Available" status for this faxed document.

If the request document contains more than one document to be faxed, a task is generated for the Image Capture person, called define document description. Opening the task shows the content of the Content manager document (in this case, the received fax) in addition to an option screen with documents to choose from (based on the request document) plus an open selection. For instance, if a configuration data and Statement Of Work are scheduled to be faxed, both documents are listed to choose from along with a third option, "choose other document type" if the requester did not choose the correct one. This provides the Image Capturer with a list of all available document types for those cases.

If a set of hardcopy documents (or one document) is received for a certain request that is acknowledgeable by the print-out of the request form, the documents are separated by a patch code document (in order to enable automated recognition of data elements encoded in the patch code by the scan equipment) and the request document print-out is used as top document to start a new batch.

If scanning is performed by the use of OCR and/or Barcode reader, the scanned document is routed to the proper folder while the task remains within the Account Administrator View. As described for incoming faxes, the Request Document holds information about the related folder ID in the Content Manager and the related request document on the request database. The process described here applies when the request was transferred to the account admin although some documents were mailed separately. The barcode on the printed request form enables the automated addition of the scanned document to the correct folder in CM.

While scanning a batch of documents (one or more documents belonging to this request), the Image Capturer is presented a list of document types from which to choose one for this document. The selection is based on the content of the request document where the requester chooses the document type. Alternately, he/she may select a different document type, if the requester did not choose the correct one. Thereafter, the document or documents are automatically added to the appropriate folder in Content Manager and are automatically indexed with the index fields as already available in folders and documents.

After all the documents are made available as image and index data fields in the request document are populated as necessary and—if applicable—the proper workflow is chosen, if the Image Capturer clicks the "Complete" feature in the request, then:

All index field values in the folder(s) and document(s) in the Content Manager are automatically updated.

The workflow audit trail field is automatically updated with "Completed on (date) and (time) stamp by performer" and a line "provided to Account Admin. Group XYZ on location ABC for workflow process "Process Contract".

Automatically a new task appears for all Account Administrators performing the role of Account Administrator within the specified process.

It is to be understood that the specific embodiments of the present invention that are described herein are merely illustrative of certain applications of the principles of the present invention. Numerous modifications may be made without departing from the scope of the invention.

TABLE 1

Coversheet Creation Database - User Role View (Requester or Customer)

| Create New Transaction | | Seq. | Cno | Cna | Cntr | Tr Val | Etc. |
|---|---|---|---|---|---|---|---|
| Items to be Actioned | | | | | | | |
| Existing Transactions: | | | | | | | |
| My Transactions: | | | | | | | |
| | Saved Requests | xxx | Xxxx | xxxx | xxxx | x | X |
| | In Process | xxx | Xxxx | x | x | x | Xx |
| | Completed | xxx | Xxxx | xx | xxx | xxx | X |
| | | xxx | Xxxx | x | xxxx | xx | X |
| All Transactions: | | | | | | | |
| In Process | | | | | | | |
| Completed | | | | | | | |
| Search Archive | | | | | | | |

TABLE 2

Create New Transaction Input Screen

| Sequence: | Request Date | Urgency | Submitter | Country |
|---|---|---|---|---|
| | Mar. 03, 2001 | Normal | Mr. XYZ | 788 |

Enter a sequence number in the above field from which to copy data from

| Customerno. | '040162 | | | |
|---|---|---|---|---|
| Customer Name | XYZ | | | |
| Enterprise No. | | | | |
| Contractno. | RSZ9-CP9912005-01 | | | |
| Trackingvalue | HBS2001/03-004 | | | |
| ProductType | Brand | | Requested Action | |
| Services | Professional Services | | Process Contract | |

| Documents delivered: | | | Method of Sending | Senddate |
|---|---|---|---|---|
| ![x] | Contract | (mandatory) | Attached | 03-03 |
| ![x] | Pricing data | (mandatory) | Attached | 03-03 |
| Y | Configuration data | (mandatory) | Fax | 03-03 |
| Y | Correspondence | (optional) | Mail | 03-03 |
| Y | Statement O.W. | (optional) | Mail | 03-03 |
| N | — | (optional) | | |
| N | — | (optional) | | |

Click to Save request and work on it later
Click to Submit this request

TABLE 3

Create New Transaction Result Screen
'In Process' View

| Sequence: | Request Date | Urgency | Submitter | Country |
|---|---|---|---|---|
| '00903441 Open Image folder | Mar. 03, 2001 | Normal IT IAP (barcode) | Mr. XYZ Workflow trail: Mar. 03, 2001, 13.03 hr. Image Capture group | 788 |
| Customerno. | '040162 | | | |
| Customer Name | XYZ | | | |
| Retrieved Enterpriseno | XYZ Inc. '670100 | | | |
| Contractno. | RSZ9-CP9912005-01 | | | |
| Trackingvalue | HBS2001/03-004 | | | |
| ProductType | Brand | | Requested Action | |
| Services | BIS Professional Services | | Process Contract | |

| Documents delivered: | | | Method of Sending | Senddate |
|---|---|---|---|---|
| ▨ | Contract | (mandatory) | Attached | 03-03 |
| ▨ | Pricing data | (mandatory) | Attached | 03-03 |
| Y | Configuration data | (mandatory) | Fax | 03-03 |
| Y | Correspondence | (optional) | Mail | 03-03 |
| Y | Statement O.W. | (optional) | Mail | 03-03 |

TABLE 4

A Transposed Array From Existing Transactions View of TABLE 1

| column header | description/explanation |
|---|---|
| Sequence number | The unique sequential sequence number of the request |
| Customer number | The customer number |
| Customer name | The retrieved customer name |
| Enterprise number | The retrieved enterprise number |
| Contract number | The contract number |
| Tracking value | The tracking value as added by the user |
| Workflow assigned to | The current role or person working on the request |

TABLE 5

Coversheet Creation Database
Image Capture And Account Administrator Role
Existing Transactions - My Transactions View

| Create New Transaction | | Seq. | Cno | Cna | Cntr | TrVal | etc. |
|---|---|---|---|---|---|---|---|
| Items to be Actioned | New Request | 441 | 162 | x | Xx | xx | X |
| | New Request | Xxx | xxxx | xx | Xxxx | | Xx |
| | Additional Info | Xxx | xxxx | xxxx | X | xxx | X |
| Existing Transactions: | | | | | | | |
| My Transactions: | | | | | | | |
| | Saved Requests | Xxx | xxxx | xxxx | Xxxx | x | X |
| | In Process | Xxx | xxxx | x | X | x | Xx |
| | On hold | Xxx | xxxx | xxx | Xxx | | |
| | Completed | Xxx | xxxx | xx | Xxx | xxx | X |
| | | Xxx | xxxx | x | Xxxx | xx | X |
| All Transactions: | | | | | | | |
| In Process | | | | | | | |
| Completed | | | | | | | |

TABLE 5-continued

Coversheet Creation Database
Image Capture And Account Administrator Role
Existing Transactions - My Transactions View

| Create New Transaction | Seq. | Cno | Cna | Cntr | TrVal | etc. |
|---|---|---|---|---|---|---|
| Search | | | | | | |
| Archive | | | | | | |

TABLE 6

A Transposed Array From The Image Capture/ Account Administrator Role View

| column header | description/explanation |
|---|---|
| Sequence number | The unique sequential sequence number of the request |
| Customer number | The customer number |
| Customer name | The retrieved customer name |
| Enterprise number | The retrieved enterprise number |
| Contract number | The contract number |
| Tracking value | The tracking value as added by the user |
| Requester | The lotus notes/Internet ID of the person who issued the request |
| Workflow assigned to | The current role or person working on the request |
| Current Workflow | The current workflow in process (eg. fulfill contract, etc.) |
| Current Task | The current task executed within the process (e.g. Image Capture) |
| Outstanding Mail | Whenever the request indicates, items are mailed |
| Outstanding Fax | Whenever the request indicates, items are faxed |

TABLE 7

| | New Transaction Screen In 'Image Capture' Role View | | | | |
|---|---|---|---|---|---|
| Complete | Save | Respond | | Transfer Task Change Workflow | Cancel |
| Sequence: '00903441 Open Image folder | Request Date Mar. 03, 2001 | Urgency Normal IT IAP (barcode) | | Submitter Mr. XYZ Workflow trail: Mar. 03, 2001, 13.03 hr. Image Captgrp, Wflow 'process contract by dept. XYZ' Saved, Mar. 03, 2001, 15.30 hr Mrs. ABC | Country 788 |
| Customerno. Customer Name Retrieved Enterpriseno Contractno. Trackingvalue Index field Index field Etc. | | | '040162 XYZ XYZ INC. '670100 RSZ9-CP9912005-01 HBS2001/03-004 | | |
| ProductType Services | Brand Professional Services | | Requested Action Process Contract | | |

| | Documents delivered: | | | Method of Sending | Senddate |
|---|---|---|---|---|---|
|  | Contract | (mandatory) | Attached | Available | 03-03 |
|  | Pricing data | (mandatory) | Attached | Available | 03-03 |
| Y | Configuration data | (mandatory) | Fax | Available | 03-03 |
| Y | Correspondence | (optional) | Mail | Outstanding | 03-03 |
| Y | Statement O.W. | (optional) | Mail | Outstanding | 03-03 |

What is claimed is:

1. A data management method comprising:

receiving a request to image a document through an electronic cover that holds data elements related to the document content, wherein the data elements are dynamic to reflect updates to the document content, wherein the electronic cover is an object that is separate from the document and that is added to the image of the document, wherein the data elements includes critical data elements, and wherein the electronic cover is used to validate the critical data elements related to the document;

processing the cover of the document for validating the data elements related to the document;

based on the validated data elements in the cover, automatically collecting data and populating at least some data fields in the cover by linking the at least some data fields to independent software applications; and storing at least some of the data populated in the cover:

for automatic reuse of the at least some of the data populated in the cover by integrated applications, to prevent re-entry of the at least some of the populated data in the integrated applications; and for reuse of the at least some of the data populated in the cover as index values, to assist in storing the document and to further assist in searching for, and locating the document, based on the document content.

2. The method of claim 1, further including reusing the data populated in the cover by automatically indexing the populated data in an imaging application.

3. The method of claim 2, further including using the cover to review the request.

4. The method of claim 3, further including feeding collected data to one or more integrated software applications.

5. The method of claim 2, further including using the cover to update a request status.

6. The method of claim 2, further including using the cover to initiate a workflow for subsequent processing.

7. The method of claim 1, wherein processing the electronic cover includes setting an electronic checklist to validate the critical data elements related to the document.

8. The method of claim 7, wherein the critical data elements include a customer number.

9. The method of claim 7, wherein the critical data elements include a contract number.

10. The method of claim 7, wherein the critical data elements include a mode of transmittal.

11. The method of claim 7, wherein the critical data elements include a new transaction.

12. The method of claim 7, wherein the critical data elements include an update.

13. The method of claim 1, wherein the information contained in the cover includes a customer master record.

14. A computer program having a plurality of executable instruction codes on a computer readable medium, comprising:

a first set of program instructions for receiving a request to image a document through an electronic cover form that holds data elements related to the document content, wherein the data elements are dynamic to reflect updates to the document content, wherein the electronic cover is an object that is separate from the document and that is added to the image of the document, wherein the data elements includes critical data elements, and wherein the electronic cover is used to validate the critical data elements related to the document;

a second set of program instructions for processing the cover form of the document for validating the data elements related to the document;

a third set of program instructions for automatically collecting data and populating at least some data fields in the cover form as a function of the validated data elements in the cover form, by linking the at least some data fields to independent software applications; and a fourth set of program instructions for storing at least some of the data populated in the cover form:

for automatically reusing at least some of the data populated in the cover form by integrated software applications, to prevent re-entry of the at least some of the populated data in the integrated software applications; and for reusing the at least some of the data populated in the cover form as index values, to assist in storing the document and to further assist in searching for, and locating the document, based on the document content.

15. The computer program of claim 14, wherein the fourth set of program instructions reuses the data populated in the cover form by automatically indexing the populated data in an imaging application.

16. The computer program of claim 15, wherein the integrated software applications use the cover form to perform any one or more of the following steps: reviewing a submission; updating a status of a request; and initiating a workflow for subsequent processing.

17. The computer program of claim 14, wherein the electronic cover form includes an electronic checklist that validates critical data elements related to the document.

18. The computer program of claim 17, wherein the critical data elements include any one or more of: a customer number, a contract number, a mode of transmittal, a new transaction, and an update.

19. The computer program of claim 14, wherein the information contained in the cover form includes a customer master record.

20. A data management system for use in a computer to integrate the operation of a plurality of independent software applications, comprising:

means for receiving a request to image a document through an electronic cover page that holds data elements related to the document content, wherein the data elements are dynamic to reflect updates to the document content, wherein the electronic cover is an object that is separate from the document and that is added to the image of the document, wherein the data elements includes critical data elements, and wherein the electronic cover is used to validate the critical data elements related to the document;

means for processing the cover page of the document for validating the data elements related to the document;

means for automatically collecting data and populating at least some data fields in the cover page, based on the validated data elements in the cover page, by linking the at least some data fields to the independent software applications; and means for storing at least some of the data populated in the cover page:

for automatic reuse of the at least some of the data populated in the cover page by integrated applications, to prevent re-entry of the at least some of the populated data in the integrated applications; and for reuse of the at least some of the data populated in the cover page as index values, to assist in storing the document and to further assist in searching far, and locating the document, based on the document content.

* * * * *